US012060009B2

(12) United States Patent
Shioguchi et al.

(10) Patent No.: US 12,060,009 B2
(45) Date of Patent: Aug. 13, 2024

(54) DRIVING ASSISTING DEVICE AND DRIVING ASSISTING METHOD

(71) Applicant: Faurecia Clarion Electronics Co., Ltd., Saitama (JP)

(72) Inventors: Takuma Shioguchi, Saitama (JP); Noriaki Aoyama, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 124 days.

(21) Appl. No.: 17/980,696

(22) Filed: Nov. 4, 2022

(65) Prior Publication Data

US 2023/0143690 A1 May 11, 2023

(30) Foreign Application Priority Data

Nov. 11, 2021 (JP) .................................. 2021-184140

(51) Int. Cl.
*G06V 20/56* (2022.01)
*B60R 1/22* (2022.01)
*B60W 60/00* (2020.01)
*G06V 40/10* (2022.01)
*H04W 4/029* (2018.01)
*H04W 4/40* (2018.01)

(52) U.S. Cl.
CPC ......... *B60R 1/22* (2022.01); *B60W 60/00253* (2020.02); *G06V 20/56* (2022.01); *G06V 40/103* (2022.01); *H04W 4/029* (2018.02); *H04W 4/40* (2018.02); *B60R 2300/607* (2013.01); *G06V 2201/07* (2022.01)

(58) Field of Classification Search
CPC .................................................... G06V 20/56
See application file for complete search history.

(56) References Cited

U.S. PATENT DOCUMENTS

2014/0176349 A1 6/2014 Smullin et al.
2015/0287322 A1 10/2015 Smullin et al.
2021/0389141 A1 12/2021 Inoue et al.

FOREIGN PATENT DOCUMENTS

JP 2007-072588 A 3/2007
JP 2021-043763 A 3/2021

*Primary Examiner* — Y Lee
(74) *Attorney, Agent, or Firm* — IP Business Solutions, LLC (57) ABSTRACT

A driving assisting device includes a vicinity information acquiring unit for acquiring vicinity information regarding an object in the vicinity of a vehicle; an image generating unit for using the vicinity information to generate an overhead image that shows the vehicle together with the vicinity thereof; a communicating unit for acquiring, through wireless communication, target person information able to identify at least a location of a target person outside of the vehicle; a vehicle location identifying unit for identifying a vehicle location and direction; a location identifying unit for identifying a location of the target person in an overhead image and identifying, in the overhead image, a stopping location that is suitable for boarding of the target person, based on the location and direction of the vehicle, identified by the vehicle location identifying unit; and an output image generating unit for generating an output image.

8 Claims, 6 Drawing Sheets

DRIVING ASSISTING DEVICE AND DRIVING ASSISTING METHOD

CROSS-REFERENCE TO RELATED APPLICATIONS

The present application claims priority under 35 U.S.C. § 119 to Japanese Patent Application No. 2021-184140 filed on Nov. 11, 2021. The content of the application is incorporated herein by reference in its entirety.

BACKGROUND OF THE INVENTION

Field of the Invention

The present invention relates to a driving assisting device and driving assisting method.

Description of the Related Art

There are known parking assisting devices for assisting in driving of a vehicle.

The Abstract in Patent Document 1 describes "comprising: a mobile telephone terminal 1 held by a waiting person, a car navigation system 2 of a vehicle 200, and a server 3 connected to these via the Internet, wherein: a server 3 receives current location information from the mobile telephone terminal 1 and the car navigation system 2, and if both are within a prescribed distance, provides notification through push-type electronic mail to at least the car navigation system."

PRIOR ART DOCUMENT

Patent Document

[Patent Document 1] Japanese Unexamined Patent Application Publication 2007-072588

In the technology set forth in Patent Document 1, the car and the waiting person must engage in communication to meet with each other after both have been notified that they are within the prescribed distance.

It will be better assistance to pick up the waiting person with minimum communication between the waiting person and the car.

Therefore, the object thereof is to enable ideal assistance in picking up an individual.

SUMMARY OF THE INVENTION

One example of the present invention is a driving assisting device installed in a vehicle, includes a vicinity information acquiring unit that acquires vicinity information of objects in the vicinity of a vehicle by a camera and/or a sensor; an image generating unit that generates an overhead image that shows the vehicle and the vicinity thereof by using the vicinity information; a communicating unit that acquires target person information identifying at least a location of a target person outside of the vehicle through wireless communication; a vehicle location identifying unit that identifies a location and a direction of the vehicle by using a satellite location measuring system; a location identifying unit that identifies a stopping location suitable for the target person to board in the overhead image based on the target person information and the location and direction of the vehicle; and an output image generating unit that generates an output image in which a first marker that indicates the location of the target person and a second marker that indicates the stopping location are superimposed on the overhead image.

Advantageous Effects of Invention

The present invention enables ideal assistance in picking up an individual.

DETAILED DESCRIPTION OF THE INVENTION

An embodiment will be explained below in reference to the drawings.

Figure 1:
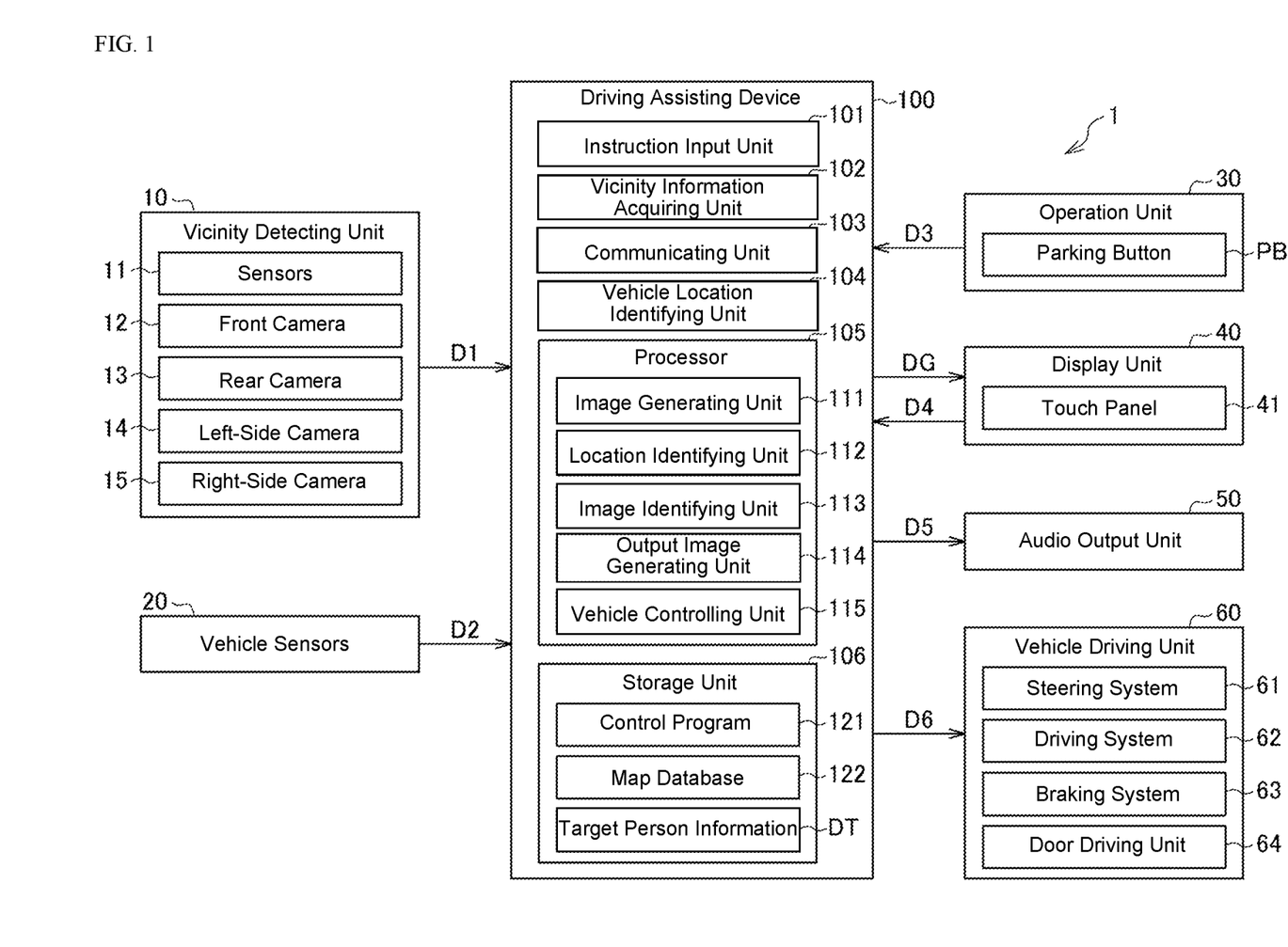
FIG. 1 shows an example of the block diagram of the driving assisting system according to the present invention.

FIG. 1 shows an example of the block diagram of the driving assisting system according to the present invention.

The driving assisting system 1 comprises a vicinity detecting unit 10, vehicle-side sensors 20, an operation unit 30, a display unit 40, an audio output unit 50, a vehicle driving unit 60, and a driving assisting device 100. The driving assisting system 1 is installed in a vehicle 2, and the driving assisting device 100 may be a part of a multipurpose in-vehicle device. The vehicle 2 moves together with a user US therein, and it is a four-wheel vehicle, i.e., automobile in the present embodiment. However, the vehicle 2 may be a vehicle other than a four-wheel vehicle. The user US is a user of the driving assisting system 1 and is the driver or a passenger of the vehicle 2.

The vicinity detecting unit 10 detects vicinity information D1 relating to objects in the vicinity of the vehicle 2, and is equipped with sensors 11, a front camera 12, a rear camera 13, a left side camera 14, and a right-side camera 15. The sensors 11 are equipped with distance measuring sensors such as sonar, lidar and perform contactless detection of whether or not there are obstacles located to the front, rear, left, and/or right of the vehicle 2, along with detecting the distances to each of the individual obstacles. The detection results from the sensors are included in the vicinity information D1. Note that sensors able to detect obstacles can be applied broadly as these sensors 11.

The front camera 12 captures images to the front of the vehicle 2. The rear camera 13 captures images to the rear of the vehicle 2. The left side camera 14 captures images to the left side of the vehicle 2. The right-side camera 15 captures images to the right side of the vehicle 2. Captured images of front, rear, left, and right of the vehicle 2 are acquired by these cameras 12-15. The captured images are included in the vicinity information D1.

For suitable capturing of the obstacles in the vicinity of the vehicle 2 and a target person TG who is a potential passenger of the vehicle 2, the following cameras 12-15 are equipped.

The front camera 12 has specifications, such as the viewing angle and the imaging range, set so as to enable imaging of the road surface to the front of the vehicle 2 and also persons, located to the front, and to the front-left and front-right, of the vehicle 2. The left side camera 14 has specifications, such as the viewing angle and the imaging range, set so as to enable imaging of the road surface (including the road shoulder and sidewalk) on the left side of the vehicle 2, and persons located on the left side of the vehicle 2. The right-side camera 15 has specifications, such as the viewing angle and the imaging range, set so as to enable imaging of the road surface (including the road shoulder and sidewalk) on the right side of the vehicle 2, and persons located on the right side of the vehicle 2. The rear camera 13 also has specifications, such as the viewing angle and the imaging range, set so as to enable imaging of the road surface to the rear of the vehicle 2 and also persons located to the rear, and to the rear-left and rear-right, of the vehicle 2.

The vehicle-side sensors 20 include sensors for detecting information for various parts of the vehicle 2 (hereinafter termed "vehicle information D2"). For example, the vehicle-side sensors 20 are a vehicle speed sensor for detecting the vehicle speed, an acceleration sensor for detecting the acceleration of the vehicle 2, and a steering angle sensor for detecting the steering angle in the vehicle 2.

The operation unit 30 receives operations by the user US. The operation unit 30 comprises hardware operation elements such as switches and buttons to output operation signals D3 corresponding to the received operations to the driving assisting device 100.

The hardware operation elements include a parking button BP. The parking button BP is an operation element that causes the vehicle 2 to travel automatically to a parking location, including the stopping location PS, described below through a vehicle driving unit 60.

The display unit 40 has a display screen that can be read by the user US. The display unit 40 inputs output image data DG outputted from the driving assisting device 100, and displays the output image corresponding to the output image data DG on the display screen. Any display device, such as a liquid crystal display device can be used as the display unit 40.

The display unit 40 comprises a touch panel 41 for detecting an operation by the user US on the display screen. The touch panel 41 detects the location of an operation by the user US in the display screen, and output an operation signal D4 that identifies the location of the operation to the driving assisting device 100.

The audio output unit 50 inputs an audio signal D5 outputted from the driving assisting device 100, and outputs audio corresponding to the audio signal D5 into the passenger cabin through a speaker provided in the vehicle 2.

The vehicle driving unit 60 performs automated driving of the vehicle 2 by driving a steering system 61, a driving system 62, and a braking controlling system 63, which compose the driving system of the vehicle 2. Additionally, the vehicle driving unit 60 has a function for causing the vehicle 2 to drive automatically to the stopping location PS following the vehicle control information D6 when it receives vehicle control information D6 instructing the stopping location PS from the driving assisting device 100.

The vehicle driving unit 60 has a function for driving a door driving unit 64 that opens and closes a door of the vehicle 2. The vehicle driving unit 60 opens/closes the door indicated by the door driving unit 64 upon input of the vehicle control information D6 that directs opening/closing of the door.

The driving assisting device 100 is an information processing device that carries out processing regarding driving assistance for the vehicle 2, which comprises an instruction input unit 101, a vicinity information acquiring unit 102, a communicating unit 103, a vehicle location identifying unit 104, a processor 105, and a storing unit 106.

The instruction input unit 101 receives various types of instructions from the user US through the operation unit 30 and the touch panel 41. The vicinity information acquiring unit 102 detects vicinity information D1 regarding objects in the vicinity of the vehicle 2 by using the sensors 11 and cameras 12-15. Note that some or all of the sensors 11 and cameras 12-15 may be provided in the driving assisting device 100.

The communicating unit 103 has a communication module that has a wireless communicating function, and acquires target person information DT that identifies at least the location of a target person TG through wireless communication.

The "target person TG" is a person who potentially will board vehicle 2, for example, a person who is waiting for the user US (a person who has made a meeting appointment), or an acquaintance such as a family member, a friend. There are two ways for acquiring the target person information DT by the communicating unit 103 as examples provided below.

By first way, the communicating unit 103 acquires the target person information DT from an individual mobile communication device carried by the target person TG by direct near field communication such as ultra-wideband radio communication (UWB), Wi-Fi (registered trademark), Bluetooth (registered trademark).

By second way, the communicating unit 103 accesses the Internet through a wireless communication network such as a public wireless communication network. The communicating unit 103 acquires the target person information DT from a mobile communication device carried by the target person TG by indirect communication through a server on the Internet.

The mobile communication device carried by the target person TG is a device that has a location detecting function and a communicating function, for example, a smart phone or a wearable device.

Information for identifying the communication destination for the communicating unit 103 (for example, an ID, telephone number, communication destination address of a smart phone) is registered in advance into the driving assisting device 100 for example. For registering the communication destination of the communicating unit 103 (for registering the target person TG), the user US directly input to the driving assisting device 100, or the user US transmits prescribed data to the driving assisting device 100 for example. Otherwise, the driving assisting device 100 acquires the target person information DT via wireless communication through a mobile communication device carried by the user US.

The target person information DT is information including location information that enables identification of the location of the target person TG and identifying information for identifying the target person TG. The detail of the target person information DT can be any appropriate information as long as it identifies the location of the target person TG and the target person TG him/herself.

The vehicle location identifying unit 104 comprises a GPS unit that receives a location measuring signal from a satellite location measuring system (GPS), and acquires the current location (latitude and longitude) and traveling direction (angle) of the vehicle 2 by the GPS signal. The GPS unit may be installed outside of the vehicle location identifying unit 104.

Additionally, the vehicle location identifying unit 104 may use a known dead reckoning technology to acquire or adjust the location and direction of the vehicle 2 of the vehicle 2 based on detection results by the vehicle-side sensors 20.

The processor 105 comprises a calculation processing unit such as a CPU (Central Processing Unit) and its peripheral circuitry, and functions as a computer for centralized control of each unit including the driving assisting device 100 of the driving assisting system 1. The processor 105 achieves the functional structure shown in FIG. 1 through executing a control program 121 stored in the storing unit 106.

That is, the processor 105 functions as an image generating unit 111, a location identifying unit 112, an image identifying unit 113, an output image generating unit 114, and a vehicle controlling unit 115.

The image generating unit 111 generate an overhead image G1 that shows the vehicle 2 together with the surrounding structures by using the vicinity information D1. In detail, the image generating unit 111 generates an overhead image G1 that is an overhead view from above the vehicle 2 by using uses the images captured by the cameras 12-15 included in the vicinity information D1. The process for generating the overhead image G1 may apply publicly known processes for generating overhead images from images captured from the front, rear, left, and right.

The location identifying unit 112 carries out a process to identify the location of the target person TG in the overhead image G1, and a process to identify a vehicle stopping location PS appropriate for the target person TG to board the vehicle in the overhead image G1. Specifically, the location identifying unit 112 the location and direction of the target person TG in reference to the vehicle 2 based on the location of the target person TG, which is identified by target person information DT, and the location and direction of the vehicle 2, which is identified by the vehicle location identifying unit 104. Next, the location identifying unit 112 identifies the location of the target person TG in the overhead image G1 from the location and direction of the target person TG in reference to the vehicle 2. The process of identifying the vehicle stopping location PS is described below.

The image identifying unit 113 identifies an image of the target person TG, in the images captured by the cameras 12-15 based on the location and direction of the vehicle 2 identified by the vehicle location identifying unit 104, and the location of the target person TG identified from the target person information DT.

Specifically, the image identifying unit 113 is able to distinguish whether or not the target person TG appears in the imaging range of the cameras 12-15 because the location and direction of the target person TG with reference to the vehicle 2 is identified based on the location and direction of the vehicle 2 and the location of the target person TG. For example, the image identifying unit 113 identifies the image of the target person TG among the images captured by cameras 12-15 and also identifies the location of the target person TG in the identified captured image upon evaluation that the target person TG appears in the imaging range of the cameras 12-15 based on the location of and direction of the target person TG with reference to the vehicle 2.

The image identifying unit 113 may use image recognition technology to recognize whether or not a person exists at the location of the target person TG in the captured image. The use of the image recognition technology enables more precise identification of the location of the target person TG in the captured image.

The output image generating unit 114 generates the output image to be displayed on the display unit 40, and outputs output image data DG for the output image. The output image includes an overhead image G1, a navigation image G2 and an image for confirming the target person G3, shown in FIG. 3.

The image G2 for navigation is an image that shows the roads in the vicinity of the vehicle 2 created by using a map database 122 stored in the storing unit 106.

The navigation mage G2 includes various types of information useful in travel by the vehicle 2. For example, when a destination is set by the user US, a recommended path from the current location to the destination is superimposed on the navigation image G2. Also, speech for navigation is sounded into the vehicle by outputting an audio signal D5 for the speech from the audio output unit 50. That is, the driving assisting device 100 functions as a navigating device.

Publicly known processes may be applied to the processes for generating the navigation images G2 and the audio signals D5. A separate functional unit for the navigation function may be provided outside of the driving assisting device 100. As explained below, the image for confirming the target person G3 is an image generated from the images captured by the cameras 12-15.

The output image generating unit 114 carries out image processing for superimposing various types of images such as markers M1 through M3 (explained bellow) onto the overhead image G1 generated by the image generating unit 111, or the navigation images G2 generated by the navigation process, or the image for confirming the target person TG, and image processing for combining the images G1-G3.

The vehicle controlling unit 115 drives the vehicle 2 to the stopping location PS, for example, automatically by controlling the vehicle driving unit 60 with vehicle control information D6 instructing the stopping location PS for example. The automatic driving controls publicly known can be applied to this control for identifying the stopping location PS and automatically driving the vehicle 2 to the stopping location PS. The automated drive control may be done by either of the vehicle controlling unit 115 and the vehicle driving unit 60.

The storing unit 106 stores various types of data such as the control program 121, the map database 122, the target person information DT, and the images captured by the individual cameras 12-15. The map database 122 may include high-precision three-dimensional map data for automated driving in addition to the normal map data used in conventional navigation processes. The high-precision three-dimensional map data enables high precision identification of objects such as locations of lanes and road shoulders and make it easier to control the automated drive to the stopping location PS for example. However, there is no necessary to uses high-precision three-dimensional map data, the vicinity information D1 may be also used for the automated drive to the stopping location PS.

The information required for identifying the stopping location PS is included in the map data stored in the map database 122 (the map data for the navigation process and/or the high precision three-dimensional map data). This information includes information for identifying on-road parking spaces, handicapped parking spaces and off-road parking spaces for example.

Figure 2:
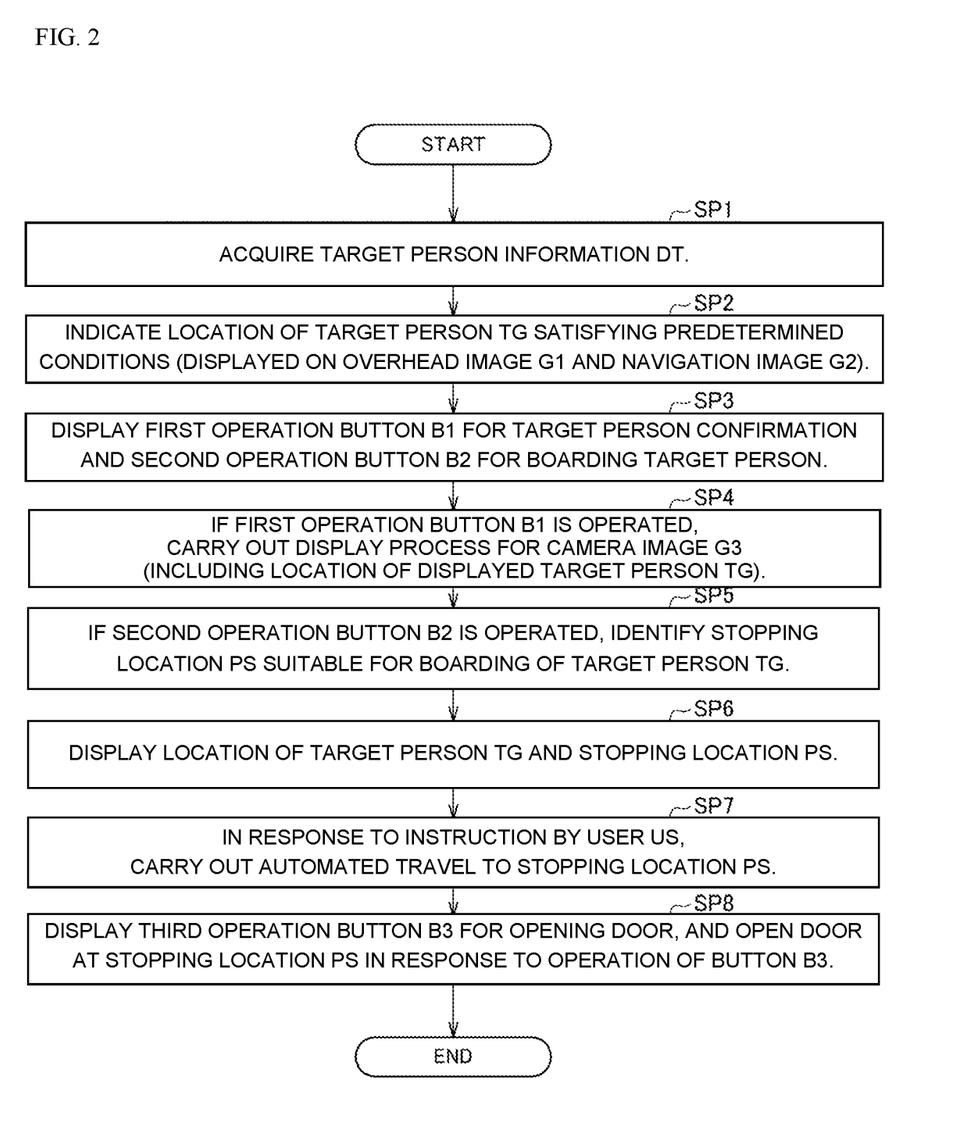
FIG. 2 show a flowchart of the operations of the driving assisting device.
Figure 3:
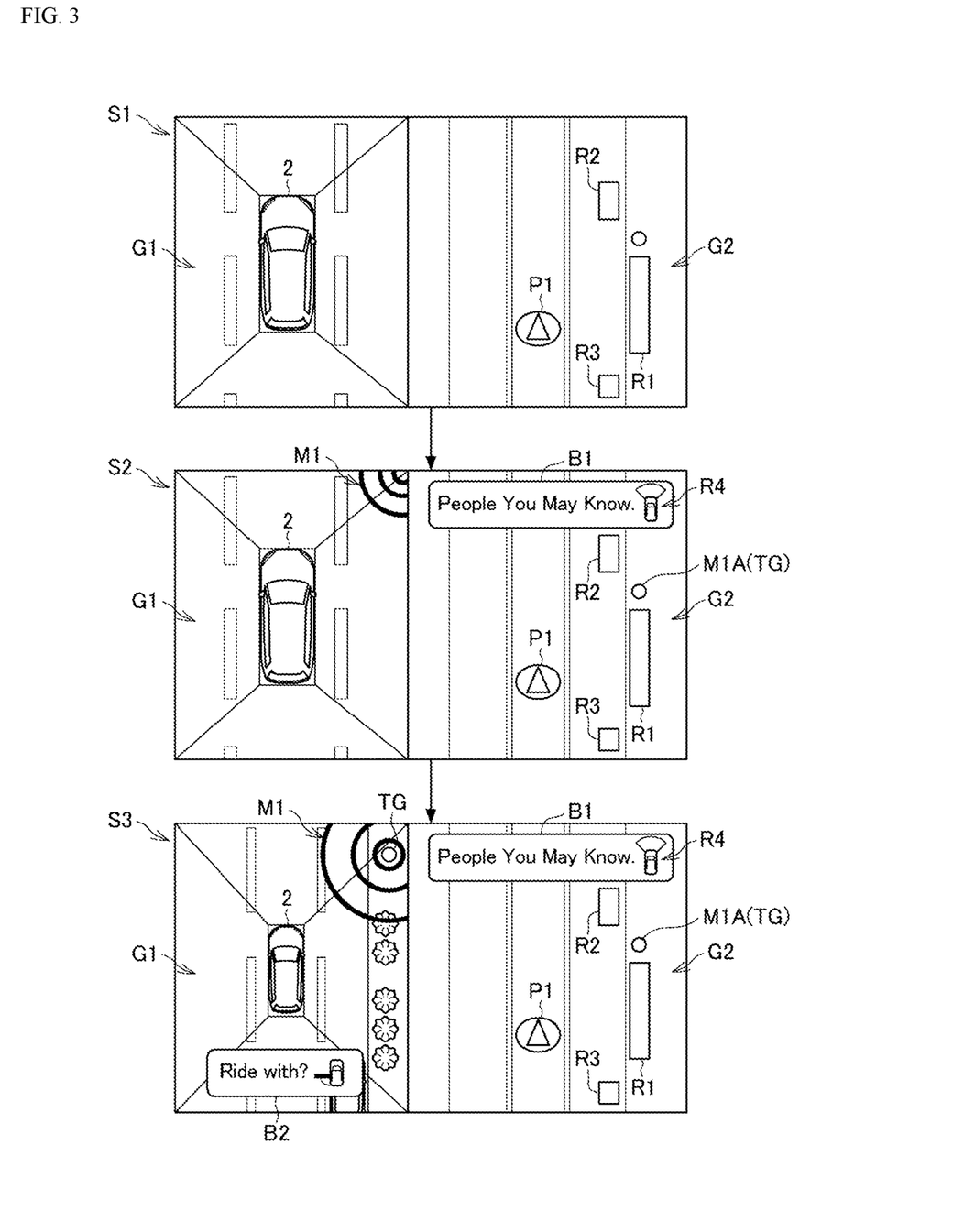
FIG. 3 shows sequential images displayed during operation of the driving assisting device.
Figure 4:
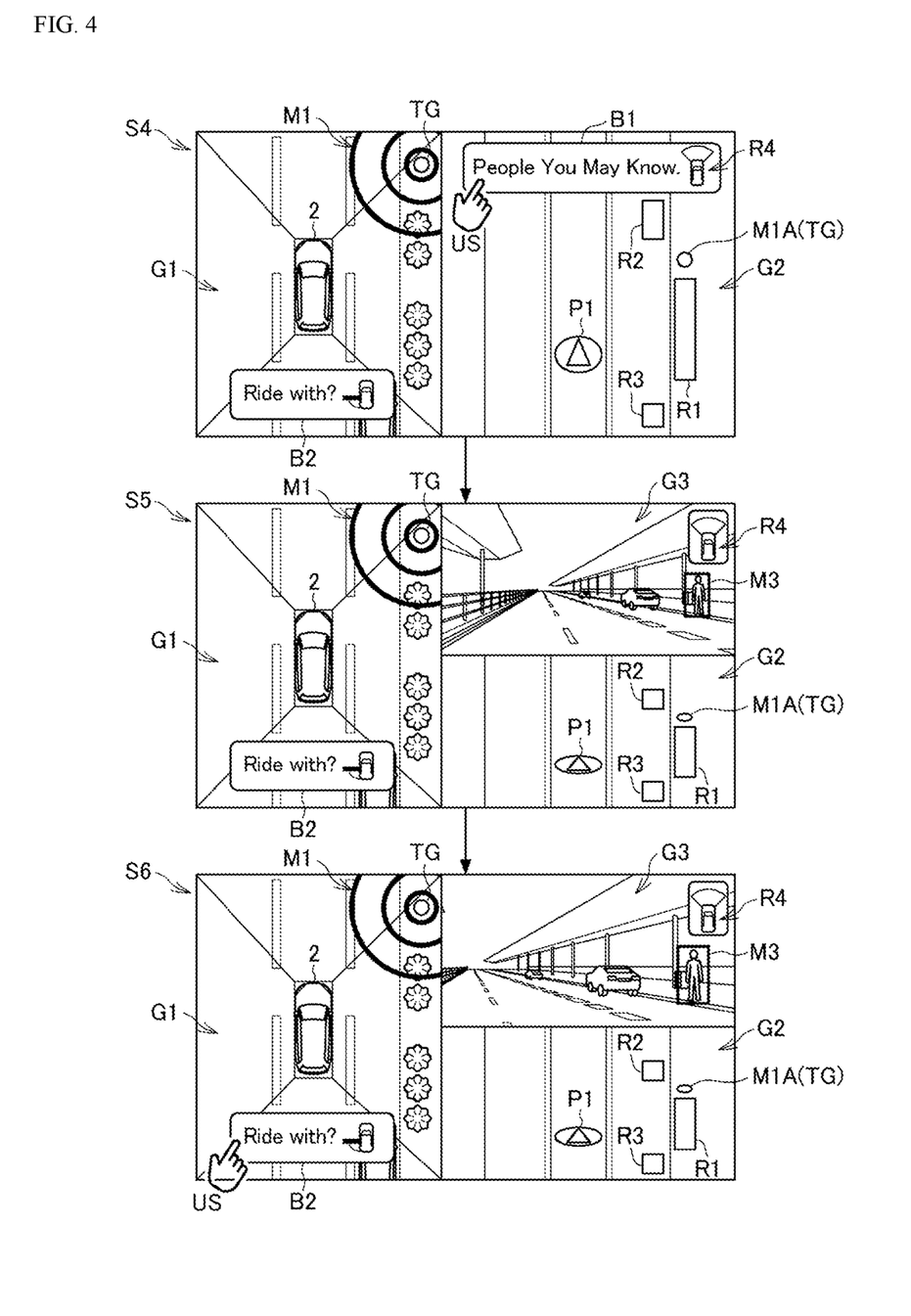
FIG. 4 shows continuing images of FIG. 3.
Figure 5:
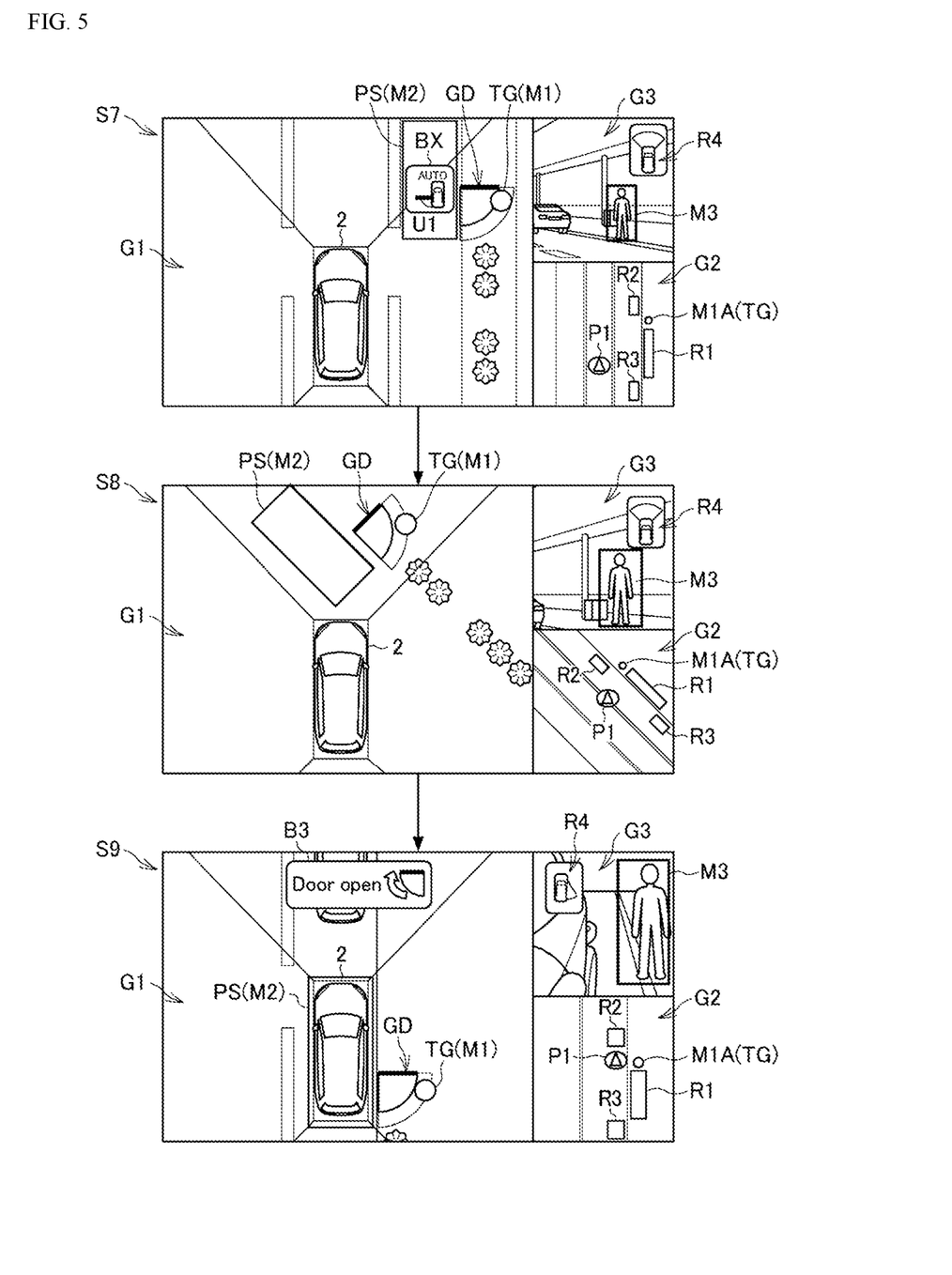
FIG. 5 shows continuing images of FIG. 4.

FIG. 2 show a flowchart of the operations of the driving assisting device 100. The flow shown in FIG. 2 is the process executed while the vehicle 2 is traveling. FIG. 3 through FIG. 5 show sequential screens displayed during operation of the driving assisting device 100. The screens shown in FIG. 3 and FIG. 4 are generated by the output image generating unit 114. The screen S1 in FIG. 3 displays an overhead image G1 on the left side and a navigation image G2 on the right side.

The overhead image G1 is an image combined from the captured images, therefore, the image enables the vehicle occupant to easily understand the shapes or colors of obstacles, road condition in the vicinity of the vehicle 2. The navigation image G2 includes a conventional image for navigation. The navigation image G2 in the present embodiment is an image on which the vehicle location mark P1 indicating the location of the vehicle 2, and obstacles (a tree R1 and other vehicles R2 and R3) identified from the vicinity information D1, are superimposed on a roadmap that includes the current location. Consequently, the vehicle occupant is able to recognize the nearby obstacles also from this navigation image G2. The details of the displayed navigation image G2 may be modified as appropriate.

FIG. 2 shows an example of the processes carried out by the driving assisting device 100. As shown in FIG. 2, the driving assisting device 100 acquires the target person information DT through the communicating unit 103 (Step SP1). Following SP1, the driving assisting device 100 indicates the location of the target person TG who satisfies predetermined conditions based on the acquired target person information DT (Step SP2).

The predetermined conditions include at least that the target person TG is within a predetermined distance range from the vehicle 2. However, in the case that the target person information DT is acquired through the near field wireless communication, the target person TG is indicated without any other condition because it is obviously that the target person TG is present within the range of the near field wireless communication.

On the other hand, in the case that the target person information DT is acquired via a server, the target person TG may be at a far distance. If the target person TG is at a far distance, it is low probability that this person will board the vehicle 2. Consequently, in this case, the distance between the vehicle 2 and the target person TG is identified based on the location of the target person TG specified by the target person information DT and the location of the vehicle 2. Then, the target person TG will be the subject of indication only if that the distance is within the predetermined distance range.

Additionally, even in the case that the target person information DT is acquired through the near field wireless communication, the indication may be limited to the target person TG who is within the predetermined distance range. The predetermined condition is not limited to the distance, but rather the number of the target person TG may be limited. In this case, the target persons TG nearer to the vehicle 2 may have priority for the indication.

In the process in Step SP2, the driving assisting device 100 identifies the location of the target person TG who is the subject for the indication in the overhead image G1 by the location identifying unit 112, and the output image generating unit 114 generates the display image, on which the first marker M1 indicating the location of the target person TG who is the subject of indication, is superimposed on the overhead image G1 as shown in the screen S2 in FIG. 3.

The first marker M1 indicates the location of the target person TG. The driving assisting device 100 may also notify the presence of a target person TG, or inform the user US of the location of the target person TG by audio announcement using the audio output unit 50.

The screen S2 in FIG. 3 shows the indication when the target person TG is identified as outside of the range of the overhead image G1 by the location identifying unit 112. In this case, the output image generating unit 114 generates an output image on which the marker identifying the direction of the target person TG is superimposed as the first marker M1. The first marker M1 for identifying the direction is displayed at the edge that of the overhead image G1 in the direction of the target person TG with reference to the vehicle 2. In this example, the first marker M1 for identifying the direction is a partial shape of a plurality of concentric circles with different diameters. Note that the first marker M1 for identifying the direction may be varied within the range that enables notification of the direction of the target person TG.

If the target person TG is identified as being within the range of the overhead image G1 by the location identifying unit 112, the output image generating unit 114 generates an output image wherein a marker (which in this example is a circle mark) that indicates the location of the target person TG is superimposed as the first marker M1 in the overhead image G1, as shown by the screen S3 in FIG. 3.

In the display example in FIG. 3, an image of a plurality of concentric circles having different diameters and a center on that location, that is, a marker for identifying the direction, is displayed as the first marker M1. in addition to the marker indicating the location of the target person TG (for example, an image of a circle). The location and direction of the target person TG can be displayed by these indicators so as to be recognized easily by the user US.

The location identifying unit 112 also carries out a process for identifying the location of the target person TG in the navigation image G2. Given this, when the target person TG is identified, by the location identifying unit 112, as being within the range of the navigation image G2, the output image generating unit 114 generates an output image, on which a navigation-side marker M1A (for example, an image of a circle) that indicates the location of the target person TG who is the subject of the notification, is superimposed onto the navigation image G2, as shown by the screen S3 in FIG. 3.

The process of Step S2 of the above is executed continuously while the target person TG satisfies the prescribed conditions.

Through this, while the target person TG is present within the predetermined range from the vehicle 2, the location identifying unit 112 continuously locates the target person TG in the overhead image G1, and the output image generating unit 114 continuously outputs output image data DG that include an output image, on which at least a first marker M1 indicating the identified target person TG is superimposed on the overhead image G1.

Additionally, when the location of the target person TG in the overhead image G1 is identified by the image identifying unit 113, an image for confirming the target person G3 will also be included in the output image data DG.

The driving assisting device 100 further executes a process for displaying a first operation button B1 for confirming the target person, and a process for displaying a second operation button B2, for a target passenger (Step SP3 in FIG. 2). By these processes, the driving assisting device 100 displays an image, on which an image providing notification of the presence of the target person TG ("People You May Know," in FIG. 3) is superimposed as the first operation button B1 on the navigation image G2 by the output image generating unit 114, as shown by screen S2 in FIG. 3. In this case, the driving assisting device 100 further displays an image R4 indicating the direction to the target person TG in the vicinity of the first operation button B1, which is generated by the output image generating unit 114.

In Step SP3, while the target person TG is identified as being within the predetermined nearby range from to the vehicle 2 by the location identifying unit 112, the driving assisting device 100 displays an image, on which an image asking whether to board the target person TG ("Ride with?" In FIG. 3) is superimposed as the second operation button B2 on the overhead image G1, which is generated by the output image generating unit 114, as shown by the screen S3 in FIG. 3.

The predetermined nearby range is a range for displaying the second operation button B2, and is set to the range in which the target person TG within the imaging range of the cameras 12-15 for example. The predetermined nearby range is set appropriately, the locations and images for the first operation button B1 and the second operation button B2 may be changed appropriately.

When the user US has touched the first operation button B1, the driving assisting device 100 displays a target person confirmation image G3 that is appropriate for confirming the target person TG by the output image generating unit 114, as shown by the screen S4 in FIG. 4 (Step SP4 in FIG. 2).

The target person confirmation image G3 is an image on which a third marker M3 indicating the location of the target person TG is superimposed on a captured image including the target person TG entered in the captured range, the captured image is one of the images captured by the cameras 12-15, as shown by the Screen S6 of FIG. 4. The display region for this target person confirmation image G3 is secured by narrowing the display range of the navigation image G2. The third marker M3 is an image of a frame shape that surrounds the target person TG, for example, but may be modified into another appropriate image.

When the user US has touched the second operation button B2, the driving assisting device 100 identifies a stopping location PS that is suitable for the target person TG to board the vehicle (Step SP5 in FIG. 2) by the location identifying unit 112, and to display a second marker M2 that indicates the location of the stopping location PS (Step SP6 in FIG. 2) by the output image generating unit 114 to carry out a process, as shown by the screen S7 in FIG. 5. Note that the display of the location of the target person TG is also continued.

The second marker M2 is an image on which an image indicating a parking space at the stopping location PS is superimposed on the overhead image G1.

The stopping location PS is a location that avoids the obstacles R1-R3 identified by the vicinity information D1, and adjacent to the target person TG. In this embodiment, a location on the road adjacent to the area of the target person TG (an area other than the road, for example, a sidewalk) or a parking space near to the target person TG is identified as the location in the vicinity of the target person TG by using data stored in the map database 122. The parking space may be an on-road parking space, a handicap parking space, or an off-road parking space.

Here, if the user US has touched the second operation button B2, or in other words, if the stopping location PS is displayed, an overhead image G1, on which the stopping location PS is superimposed, is enlarged, and the navigation image G2 and the target person confirmation image G3 shrunk, as indicated by the screens S7, S8, and S9 in FIG. 5. Note that the target person confirmation image G3 is a trimmed image with the vicinity of the location of the target person TG (corresponding to the location of the third marker M3). Therefore, the amount of shrinking of the image size of the target person TG is reduced and the target person TG can be recognized easier by the user US.

An image GD, that shows the door opening location when the vehicle has stopped at the stopping location PS (hereinafter termed a "door open image GD"), is superimposed on the navigation image G2. The location of the door open image GD is a location identified by the location identifying unit 112 using a registered information for the door location of the vehicle 2. FIG. 5 shows the location at which the back seat door on the target person TG side has opened among the left and right back seat doors of the vehicle 2.

The display image indicated of the screen S7 of FIG. 5 includes an overhead image G1 wherein the vehicle 2 is viewed from above together with the stopping location PS, so can be used as a guiding image for guiding to drive the vehicle 2 to the stopping location PS. Consequently, the user US can easily drive to the stopping location PS using the overhead image G1. The display image is also changed to the screens S8 and S9 sequentially as shown in FIG. 5 according to the movement of the location of the vehicle 2.

This driving assisting device 100 has a function for carrying out automated drive by the vehicle driving unit 60, to the stopping location PS by the instruction of the user US. For the details, the driving assisting device 100 superimposes an image of a pickup button BX (refer to the screen S7 in FIG. 5) for directing to pick up the target person TG on the overhead image G1 in the process in Step SP6 for displaying the stopping location PS. The automated drive to the stopping location PS is started by the vehicle driving unit 60 when the user US gives a touch operation on the pickup button BX and the parking button BP.

In this case, after the pickup button BX has been touched by the user US, the automated drive to the stopping location PS is continued by the vehicle driving unit 60 while the parking button BP is kept pressed. If the parking button BP ceases to be pressed during this automated drive, the automated drive to the stopping location PS is interrupt.

When the driving assisting device 100 detects the vehicle 2 has moved to the stopping location PS by the vehicle location identifying unit 104, a process for displaying the third operation button B3 for opening the door, and a process for opening the door at the stopping location PS in response to operation of the third operation button B3 (Step SP8 of FIG. 2).

As indicated by the screen S9 of FIG. 5, an image of the third operation button B3 is displayed superimposed on the overhead image G1. When the third operation button B3 is touched by the user US, the driving assisting device 100 outputs vehicle control information D6 for directing opening of the door that is suitable for the target person TG to board by the vehicle controlling unit 115, and the indicated door opens. This operation enables the target person TG to board the vehicle 2 easily. The door may be manually closed by the target person TG or remotely closed by touching again the third operation button B3 by the user US.

As explained above, the driving assisting device 100 comprises a vicinity information acquiring unit 102, an image generating unit 111, a communicating unit 103, a vehicle location identifying unit 104, a location identifying unit 112, and an output image generating unit 114. The location identifying unit 112 identifies the location of the target person TG in the overhead image G1 generated by the image generating unit 111, and also identifies a stopping location PS in the overhead image G1 that is suitable for the target person TG to board, based on the target person information DT acquired by the communicating unit 103 and the location and direction of the vehicle 2 identified by the vehicle location identifying unit 104. The output image generating unit 114 generates an output image on which the first marker M1 indicating the location of the target person TG and the second marker M2 indicating the stopping location PS are superimposed, and outputs output image data DG of the output image.

This operations enable assistance optimized for picking up the target person TG by displaying visible information that indicates the location of the target person TG and the location for picking up the target person TG.

The driving assisting device 100 also comprises the image identifying unit 113 that identifies the image of the target person TG in the images captured by the cameras 12-15 based on the location and direction of the vehicle 2, identified by the vehicle location identifying unit 104, and the location of the target person TG, identified by the target person information DT. The output image data DG includes the target person confirmation image G3 on which the third marker M3 indicating the location of the image of the target person TG is superimposed on the captured image identified by the image identifying unit 113.

This makes the user US to identify the target person TG rapidly, making it easy to determine whether or not to pick up the target person TG. Therefore, the user US can pick up a person who has been confirmed in advance.

The driving assisting device 100 comprises a vehicle controlling unit 115 for stopping the vehicle 2 at the identified stopping location PS by controlling the driving system of the vehicle 2 based on the instruction of the user US. This enables the vehicle 2 to move easily to the stopping location PS and makes it easy to pick up the target person TG.

If the target person TG is outside of the range of the overhead image G1, the output image generating unit 114 generates the output image, on which at least a direction identifying marker indicating the direction toward the target person TG is superimposed on the overhead image G1 as the first marker M1, and outputs the output image data DG including the output image.

This makes it easier to find the target person TG visually and to drive the vehicle 2 to approach to the target person TG because the user US can confirm the direction to the target person TG in advance.

If the target person TG exists within the predetermined range from the vehicle 2, the location identifying unit 112 continuously identifies the location of the target person TG in the overhead image G1, and the output image generating unit 114 continuously outputs the output image data DG including an output image on which at least the first marker M1 indicating the location of the identified target person TG is superimposed on the overhead image G1. When the location of the target person TG in the overhead image G1 is identified by the image identifying unit 113, the target person confirmation image G3 is added in the output image data DG. Therefore, the user US can check the location and image of the target person TG continuously.

The location identifying unit 112 identifies objects in the vicinity of the vehicle 2 and the target person TG based on the vicinity information D1, and identifies the location avoiding at least these objects as the stopping location PS that is suitable for boarding of the target person TG. Therefore, it is easily to get the stopping location PS where the vehicle 2 can stop and the target person TG can board easily because the stopping location PS is identified avoiding the objects.

In the process of identifying the stopping location PS, the location identifying unit 112 may identify an attribute of the identified target person TG relating to its boarding, and may identify a stopping location PS depending on the identified attribute. The attribute relating to boarding by the target person TG may include the age of the target person TG, whether the target person TG has an injury or not, or whether has the target person TG has a handicap. While there is no particular limitation on the method for evaluating the attribute of the target person TG, the evaluation may be done by recognition of the image captured by the camera 12 or by adding attribute information to the target person information DT.

For example, if the target person TG is a minor (less than 18 years old), an elderly person, an injured person, or a handicapped person, an off-road parking space or a handicapped parking space is identified as the stopping location PS, and if an attribute other than these, an on-road parking space near to the target person TG may be identified as the stopping location PS. The type of attribute, and the process for identifying the stopping location PS depending on the attribute, may be changed as appropriate. This operation makes it easy to identify the appropriate stopping location PS suitable for each the target person TG, in case that the person requires special considerations regarding boarding.

The present embodiment of the above is no more than an illustrative example of one embodiment according to the present invention, and appropriate modifications and applications are possible in a range that does not deviate from the spirit or intent of the present invention.

For example, the displayed screens shown in FIG. 3 through FIG. 5 are examples. All of the overhead image G1, the navigation image G2 and the target person confirmation image G3 need not to be displayed, but rather some of these images may be removed by an operation of the user US.

Additionally, while the overhead image G1 was an image in the plan view from above the vehicle 2, it may instead be an image that is from a different viewpoint using a technology to convert the viewpoint. Additionally, the images for each of the markers M1-M3 may be modified as appropriate.

Figure 6:
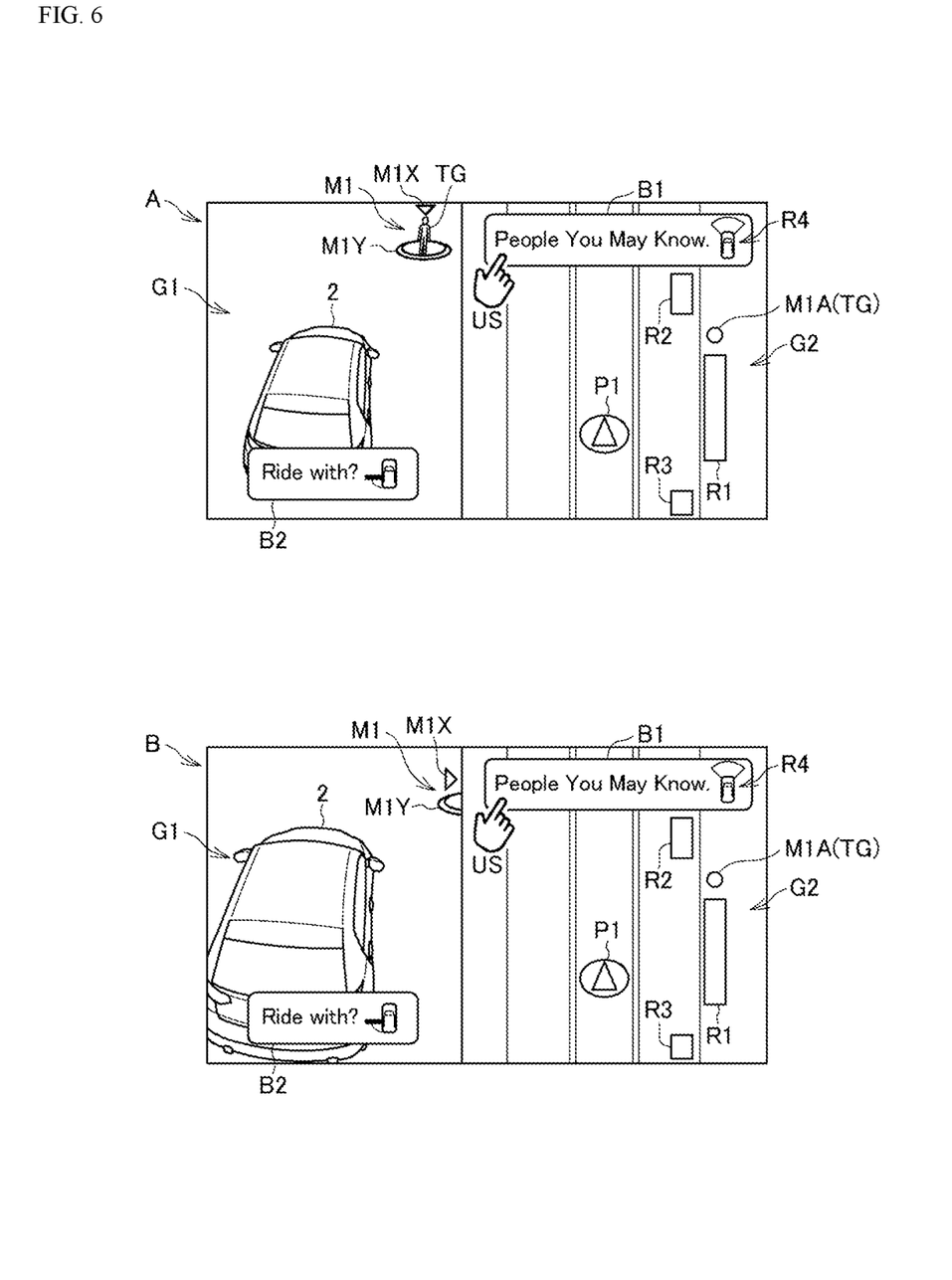
FIG. 6 shows a modified example of an overhead image.

FIG. 6 shows a modified example of the overhead image G1. The overhead image G1 is a view from a viewpoint above the rear of the vehicle 2 as shown by the screens A and B in FIG. 6. As shown by the screen A in FIG. 6, if the target person TG is within the range of the overhead image G1, the first marker M1 will be displayed. This first marker M1 includes a first image M1X that is located directly above the location of the target person TG.

While there is no particular limitation on the first image M1X, a triangular image that is parallel to the surface of the ground in the overhead image G1 may be used for example. The user US can easily ascertain the location of the target person TG through the first image M1X. The first marker M1 in FIG. 6 also includes an image of a plurality of concentric circles surrounding the location of the target person TG. These images enable displaying of an overhead image G1 by which the user US can easily recognize the location of the target person TG in visual.

On the screen of FIG. 6A, the first marker M1 for the case of the target person TG being outside of the range of the overhead image G1. This first marker M1 includes a direction identifying marker M1Y that functions as the second image. The direction identifying marker M1Y is displayed at the location farthest away in the direction of the target person TG with reference to the vehicle 2 in the overhead image G1, and is a triangular shaped image with the apex positioned in the direction of the target person TG. The user US can easily identify the direction of the target person TG by displaying an image superimposed by this direction identifying marker M1Y.

Note that while cases have been explained wherein the driving assisting device 100 and driving assisting method are applied in a driving assisting system 1 shown in FIG. 1, there is no limitation thereto.

For example, the vicinity information acquiring unit 102 may use any of the sensors 11 or cameras 12-15 to detect vicinity information D1 identifying objects in the vicinity of the vehicle 2. In case that the sensors 11 are not used, the objects can be detected by image recognition of the images captured by the cameras 12-15.

FIG. 1 is a schematic diagram only showing the elements categorized by the main processes for easy understandings of the invention, therefore, these elements can be categorized into more detailed elements depending on the processes. Each process of the elements may be executed by any of a single hardware part or multiple hardware parts, otherwise by any of a single program routine or multiple program routines.

The processing steps in the flowchart shown in FIG. 2 are divided depending on the main processing units. Embodiments of the invention are not limited by these processing units divided herewith nor by the names thereof in the flowchart. Also, the processing sequence in the flowchart is not limited to the above example illustrated thereby.

In the case that the control program 121 according to the present invention is achieved by a computer, the control program 121 may be in the form of a recording medium or a transmission medium for transmitting a program. A magnetic or optical recording medium, or a semiconductor memory device may be used for the recording medium. For example, a flexible disk, an HDD (Hard Disk Drive), a CD-ROM (Compact Disc Read-Only Memory), a DVD, a Blu-ray (registered trademark) disk, or a magnetooptical disk may be used for the recording medium. A flash memory, a card-type recording medium, or another portable or fixed recording medium may be used for the recording medium. The recording medium may be a nonvolatile storing device such as a ROM, HDD that is an internal storing device provided within the driving assisting device.

REFERENCE SIGNS LIST

1: Driving Assisting System
2: Vehicle
12-15: Cameras
20: Vehicle-Side Sensors
100: Driving Assisting Device
101: Instruction Input Unit
102: Vicinity Information Acquiring Unit
103: Communicating Unit
104: Vehicle Location Identifying Unit
105: Processor
106: Storing Unit
111: Image Generating Unit
112: Location Identifying Unit
113: Image Identifying Unit
114: Output Image Generating Unit
115: Vehicle Controlling Unit
121: Control Program
DT: Target Person Information
DG: Output Image Data
D1: Vicinity Information

What is claimed is:

1. A driving assisting device installed in a vehicle, comprising:
a vicinity information acquiring unit that acquires vicinity information of objects in the vicinity of a vehicle by a camera and/or a sensor;
an image generating unit that generates an overhead image that shows the vehicle and the vicinity thereof by using the vicinity information;
a communicating unit that acquires target person information identifying at least a location of a target person outside of the vehicle through wireless communication;
a vehicle location identifying unit that identifies a location and a direction of the vehicle by using a satellite location measuring system;
a location identifying unit that identifies a stopping location suitable for the target person to board in the overhead image based on the target person information and the location and direction of the vehicle; and
an output image generating unit that generates an output image in which a first marker that indicates the location of the target person and a second marker that indicates the stopping location are superimposed on the overhead image.

2. The driving assisting device according to claim 1, further comprising:
an image identifying unit that identifies the target person in an image captured by the camera based on the location and the direction of the vehicle identified by the vehicle location identifying unit and the location of the target person identified by the target person information,
wherein the output image includes a target person confirmation image in which a third marker indicating the location of the target person is superimposed on the captured image.

3. The driving assisting device according to claim 2, wherein: the location identifying unit continuously identifies the location of the target person in the overhead image as long as the target person is within a preferment range from the vehicle, and
the output image generating unit continuously outputs the output image superimposed by at least the first marker that indicates the location of the target person, and, add the target person confirmation image in the output image when the location of the target person in the overhead image is identified by the image identifying unit.

4. The driving assisting device according to claim 1, further comprising:
a vehicle controlling unit that controls a driving system of the vehicle to stop the vehicle at the identified stopping location based on an instruction by an occupant of the vehicle.

5. The driving assisting device according to claim 1, wherein the first maker identifies the direction of the target person if the target person is outside the range of the overhead image.

6. The driving assisting device according to claim 1, wherein the location identifying unit identifies objects in the vicinity of the vehicle and the target person based on the vicinity information, and identifies the stopping location that avoids the object.

7. The driving assisting device according to claim 1, wherein the location identifying unit identifies an attribute regarding boarding of the target person and identifies the stopping location suitable for the attribute.

8. A driving assisting method comprising the steps of:

acquiring vicinity information of objects in the vicinity of a vehicle by a camera and/or a sensor;

generating an overhead image that shows the vehicle and the vicinity thereof by using the vicinity information;

acquiring target person information identifying at least a location of a target person outside of the vehicle through wireless communication;

identifying a location and a direction of the vehicle by using a satellite location measuring system;

identifying a stopping location suitable for the target person to board in the overhead image based on the target person information and the location and the direction of the vehicle;

generating an output image in which a first marker that indicates the location of the target person and a second marker that indicates the stopping location are superimposed on the overhead image.

* * * * *